United States Patent
Pyeoun et al.

(10) Patent No.: US 9,191,594 B2
(45) Date of Patent: Nov. 17, 2015

(54) DEAD PIXEL CORRECTION APPARATUS, IMAGE SENSOR HAVING THE SAME, AND OPERATION METHOD OF IMAGE SENSOR

(71) Applicant: SK hynix Inc., Gyeonggi-do (KR)

(72) Inventors: Chang-Hee Pyeoun, Gyeonggi-do (KR); Jong-Suk Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/106,796

(22) Filed: Dec. 15, 2013

(65) Prior Publication Data
US 2015/0029368 A1  Jan. 29, 2015

(30) Foreign Application Priority Data
Jul. 29, 2013 (KR) ........................ 10-2013-0089436

(51) Int. Cl.
*H04N 5/367* (2011.01)

(52) U.S. Cl.
CPC ..................................... *H04N 5/367* (2013.01)

(58) Field of Classification Search
None
See application file for complete search history.

(56) References Cited

U.S. PATENT DOCUMENTS

| | | | | |
|---|---|---|---|---|
| 7,034,872 | B1 * | 4/2006 | Yamamoto | 348/246 |
| 2003/0007081 | A1 * | 1/2003 | Kwon et al. | 348/247 |
| 2003/0020819 | A1 * | 1/2003 | Fukuda | 348/246 |
| 2011/0102650 | A1 * | 5/2011 | Shoyama | 348/247 |

FOREIGN PATENT DOCUMENTS

| | | |
|---|---|---|
| KR | 1020000044543 | 7/2000 |
| KR | 1020110123923 | 11/2011 |
| KR | 1020120004750 | 1/2012 |
| KR | 1020120045223 | 5/2012 |

* cited by examiner

*Primary Examiner* — Albert Cutler
(74) *Attorney, Agent, or Firm* — IP & T Group LLP

(57) ABSTRACT

A dead pixel correction apparatus includes a storage unit suitable for storing position information of dead pixels obtained from pixel data, a data scanning section suitable for scanning the position information stored in the storage unit, a valid data determination section suitable for determining valid data with respect to the scanned position information, a valid data pre-processing section suitable for pre-processing the determined valid data, and a dead pixel correction section suitable for correcting pixel values corresponding to the dead pixels in current pixel data based on the pre-processed valid data, and outputting the corrected pixel data.

12 Claims, 5 Drawing Sheets

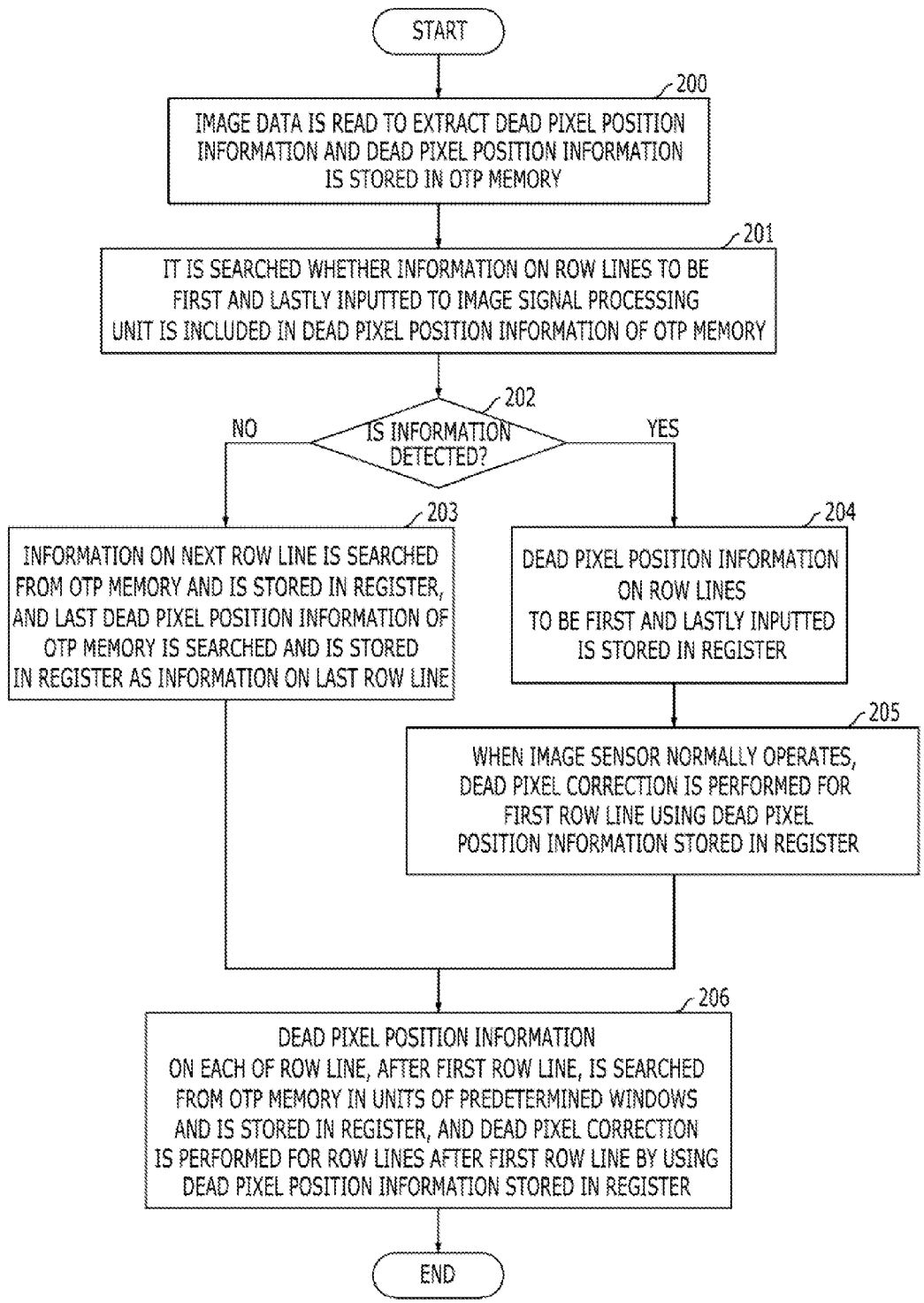

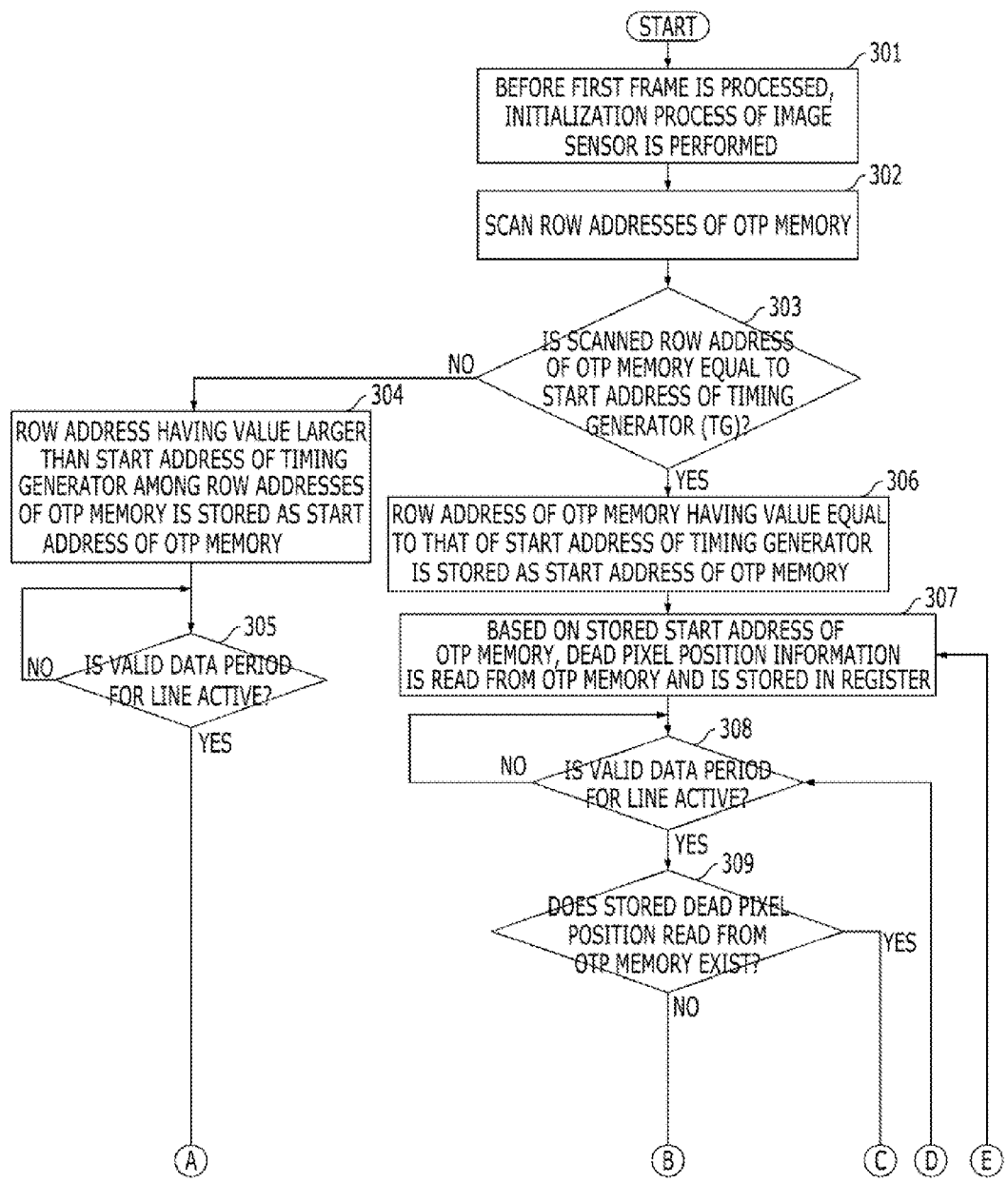

DEAD PIXEL CORRECTION APPARATUS, IMAGE SENSOR HAVING THE SAME, AND OPERATION METHOD OF IMAGE SENSOR

CROSS-REFERENCE TO RELATED APPLICATIONS

The present application claims priority of Korean Patent Application No. 10-2013-0089436, filed on Jul. 29, 2013, which is incorporated herein by reference in its entirety.

BACKGROUND

1. Field

Exemplary embodiments of the present invention relate to an image signal processing technology, and more particularly, to a dead pixel correction apparatus and an image sensor having the same.

2. Description of the Related Art

In a conventional dead pixel correction method, since a dead pixel correction algorithm operates based on inputted image pixel values, dead pixel detection and correction may not be accurately performed, so that uncorrected dead pixel data may exist due to the usage of a probabilistic compensation method.

That is, an image signal processing unit in an image sensor recognizes and processes the dead pixel using a kernel having a limited size only within an inputted kernel due to the limitation in a hardware resource. Accordingly, when an obtained pixel information pattern is similar to the pattern of a dead pixel, the dead pixel may not be normally corrected. Furthermore, when two or more dead pixels exist, a compensation ratio may be reduced. Particularly, when the dead pixels are adjacent to each other, the compensation ratio may be significantly reduced.

SUMMARY

An embodiment of the present invention is directed to a dead pixel correction apparatus that may ensure a high compensation ratio while using a simple scheme, and an image sensor having the same and an operation method of an image sensor.

In accordance with an embodiment of the present invention, a dead pixel correction apparatus may include a storage unit suitable for storing position information of dead pixels obtained from pixel data, a data scanning section suitable for scanning the position information stored in the storage unit, a valid data determination section suitable for determining valid data with respect to the scanned position information, a valid data pre-processing section suitable for pre-processing the determined valid data, and a dead pixel correction section suitable for correcting pixel values corresponding to the dead pixels in current pixel data based on the pre-processed valid data, and outputting the corrected pixel data.

In accordance with another embodiment of the present invention, a dead pixel correction method may include reading pixel data to extract position information of dead pixels from pixel data, and storing the position information in a storage unit, searching the position information on an initial row line from the storage unit, and storing the position information in a register, correcting dead pixels with respect to a corresponding row line by using the position information stored in the register when pixel data is inputted, and searching position information on each of row lines from the storage unit in units of predetermined windows, storing the position information in the register, and correcting dead pixels with respect to the corresponding row line by using the position information stored in the register.

In accordance with another embodiment of the present invention, an image sensor may include a pixel array suitable for generating an analog pixel signal, a column circuit suitable for converting the analog pixel signal generated in the pixel array into a digital pixel signal, and outputting the digital pixel signal as a pixel data, a storage unit suitable for storing position information of dead pixels obtained from pixel data, a data scanning section suitable for scanning the position information stored in the storage unit, a valid data determination section suitable for determining valid data with respect to the scanned position information, a valid data pre-processing section suitable for pre-processing the determined valid data, and a dead pixel correction section suitable for correcting pixel values corresponding to the dead pixels in current pixel data output from the column circuit based on the pre-processed position information.

The dead pixel correction apparatus in accordance with the embodiments of the present invention may read image information (or image data) outputted from an image sensor to extract the position information of a dead pixel, store the extracted information in an OTP memory, and correct the dead pixel, when the image sensor normally operates, based on the image information by using the stored dead pixel position information.

According to the embodiments of the present invention, an image sensor may correct an adjacent dead pixel (ADP) as well as a single dead pixel, so that a yield of the image sensor may be improved.

Furthermore, according to the embodiments of the present invention, it may be possible to correct a dead pixel when the image sensor normally operates, by a minimum control logic configuration.

Furthermore, according to the embodiments of the present invention, unlike an existing dead pixel correction scheme using a static random access memory (SRAM), it may be possible to correct a dead pixel by a simple scheme using a register.

BRIEF DESCRIPTION OF THE DRAWINGS

FIG. 2 is a flowchart for explaining a dead pixel correction method in accordance with an embodiment of the present invention.

FIGS. 3A and 3B are detailed flowcharts illustrating a process of correcting a dead pixel with respect to one frame period in a dead pixel correction method in accordance with an embodiment of the present invention.

DETAILED DESCRIPTION

Figure 1:
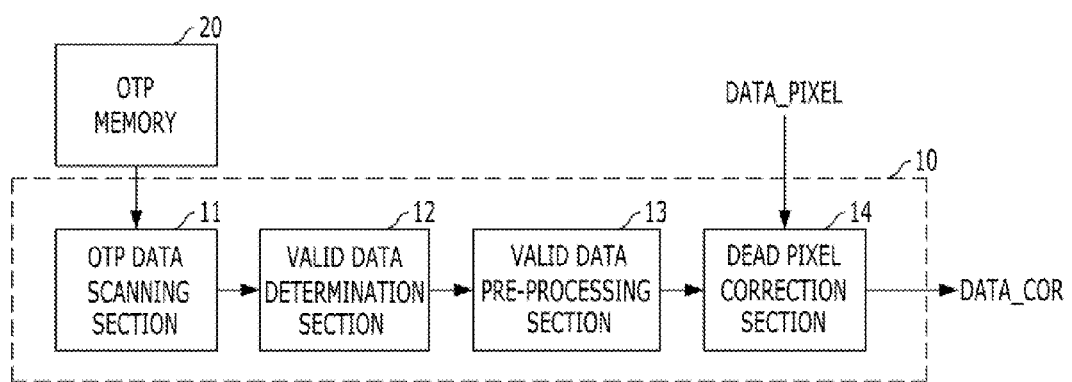
FIG. 1 is a block diagram illustrating a dead pixel correction apparatus in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

In order to facilitate the understanding of an embodiment of the present invention, the technical scope of the present invention will be described as follows.

In general, an image sensor includes a pixel array, an analog-to-digital converter, and an image signal processing unit. The pixel array includes several hundreds of thousands a plurality of unit pixels (e.g., several hundreds of thousands of unit pixels) and converts charges stored in the pixels into voltages. The analog-to-digital converter coverts the voltages changed in the pixel array into digital values processable by a digital logic. The image signal processing unit processes the digital values converted by the analog-to-digital converter and improves image quality.

In the image sensor including the unit pixels, there exist pixels that may not perform a normal pixel operation due to physical properties or physical defects occurred during a process, thereby indicating very high or low pixel values regardless of luminance. Such pixels are called dead pixels.

However, since when a predetermined number or more of dead pixels are detected in an image sensor, the corresponding image sensor is sorted out as a defective product, the number of the dead pixels directly affects a yield of the image sensor. Accordingly, correcting the dead pixels is one of important factors that may improve the yield of the image sensor.

In a dead pixel correction process, dead pixels are corrected using neighboring pixel values. The correction method changes depending on distributions and shapes of the dead pixels. In the following embodiment of the present invention, a description will be provided for the cases in which two dead pixel correction methods, that is, an adjacent dead pixel (ADP) correction method and a single dead pixel (SDP) correction method are applied.

In the embodiment of the present invention, image information (or image data or pixel data) outputted from the image sensor is read to extract position information of dead pixels, the extracted position information is stored in a one-time programmable (OTP) memory. The dead pixels may be corrected based on image information outputted from an analog-to-digital converter in the image sensor by using the position information stored in the OTP memory when the image sensor normally operates.

To this end, in the embodiment of the present invention, the position information of dead pixels is extracted from image information, which is obtained in a wafer level test for a pixel array within the image sensor performed under an environment of specific luminance and gain and stored in the OTP memory. Then, the dead pixel is corrected using a minimum control logic configuration when the modulated image sensor normally operates.

FIG. 1 is a block diagram of a dead pixel correction apparatus in accordance with an embodiment of the present invention.

As illustrated in FIG. 1, the dead pixel correction apparatus may include an image signal processing unit 10 and an OTP memory 20. Further, the image signal processing unit 10 may include an OTP data scanning section 11, a valid data determination section 12, a valid data pre-processing section 13, and a dead pixel correction section 14. The OTP memory 20 may store the position information of a dead pixel previously obtained through reading and extracting in processes for image data that is outputted from an image sensor. The OTP data scanning section 11 may search (or scan) the position information stored in the OTP memory 20 and store the position information in a register. The valid data determination section 12 may determine valid data with respect to the position information scanned by the OTP data scanning section 11. The valid data pre-processing section 13 may pre-process the valid data determined by the valid data determination section 12. The dead pixel correction section 14 may correct pixel values corresponding to dead pixels in current pixel data DATA_PIXEL based on the valid data pre-processed by the valid data pre-processing section 13, and output the corrected pixel data DATA_COR.

FIG. 2 is a flowchart for explaining a dead pixel correction method in accordance with an embodiment of the present invention.

Referring to FIGS. 1 and 2, first, image data is read to extract the position information of a dead pixel, and the extracted position information is stored in the OTP memory 20 at step 200. That is, in the embodiment of the present invention, the image data, which is acquired in a wafer level test for a pixel array within the image sensor performed under an environment of specific luminance and gain, is read to extract the position information of the dead pixel, and the extracted position information is stored in the OTP memory 20. At this time, the position information stored in the OTP memory 20 mainly includes position information of an adjacent dead pixel (ADP).

Meanwhile, when the image sensor normally operates, the image signal processing unit 10 corrects pixel values corresponding to the dead pixels based on image information, which is outputted from an analog-to-digital converter of the image sensor, by using the position information stored in the OTP memory 20. In order to read the position information from the OTP memory 20, a significantly much time is required as compared with a unit pixel processing time.

In this regard, in the conventional method, in order to use the position information stored in the OTP memory 20 while processing image data, the position information stored in the OTP memory 20 is read in advance and is stored in a separate static random access memory (SRAM), and then a dead pixel is corrected using the position information stored in the SRAM while processing image data that is outputted from the analog-to-digital converter of the image sensor. Accordingly, in order to perform the conventional dead pixel correction method, the additional complicated control' logic and the SRAM are required.

In order to resolve such concerns, the dead pixel is corrected as follows in the embodiment of the present invention.

First, it is searched whether information on row lines to be first and lastly inputted to the image signal processing unit 10 is included in the position information of the OTP memory 20 at step 201. In more detail, before a first frame is processed, initialization is performed in the image sensor and a time required for accumulating charge is consumed by a luminance time set for the pixel array. During this time, the OTP data scanning section 11 searches whether position information on a row line to be first inputted to the image signal processing unit 10 and position information on a row line to be inputted to the image signal processing unit 10 are included in the position information stored in the OTP memory 20.

As a result of the search, when the two types of information is not detected during the search of the OTP memory 20, information on a next row line is searched from the OTP memory 20 and is stored in a register, and last position information of the OTP memory 20 is searched and is stored in the register as information on the last row line at step 203. For example, when the two types of information is not detected from the OTP memory 20, information on a row line having an address value larger than that of the row line to be first inputted is searched from the OTP memory 20, column information on the corresponding row line is read and stored in the register, and the last position information stored in the OTP memory 20 is read and stored in the register as the information on the last row line. At this time, only the position information among the searched information may be stored. In the case where the SRAM is used, all dead pixel position information stored in the OTP memory 20 is read and stored in the SRAM unlike the above.

Meanwhile, when the two types of information is detected during the search of the OTP memory 20, the position information on the row lines to be first and lastly inputted is stored in the register at step 204. For example, when addresses of the row lines to be first and finally inputted to the image signal processing unit 10 are searched during the row line scanning of the OTP memory 20, position information on the corresponding row lines is read from the OTP memory 20 in advance and is stored in the register.

Then, when the image sensor normally operates and image information outputted from the analog-to-digital converter is inputted to the image signal processing unit 10, the dead pixel correction section 14 performs dead pixel correction for the first row line using the position information stored in the register at step 205.

Meanwhile position information on each of the row lines, after the first row line, is searched from the OTP memory 20 in units of predetermined windows and is stored in the register, and dead pixel correction is performed for the row lines, after the first row line, by using the position information stored in the register at step 206.

That is, since an absolute time is required to read the position information from the OTP memory 20 for the row lines after the first row line, information on a next row line is searched from the OTP memory 20 during the process for a current row line, and thus it is determined whether dead pixel position information corresponding to the next row line exists. At this time, the amount of data of a dead pixel changes depending on the characteristics of the pixel array. When the characteristics are not good, the amount of data of a dead pixel to be stored in the OTP memory 20 increases. This means an increase in a time for searching information on a next row line at the process for a previous row line. To supplement this concern, an index increase search method, other than a full search method, for searching the OTP memory 20, is used. That is, row addresses stored in the OTP memory 20 are searched in units of predetermined windows, row addresses for image data to be outputted next time are determined, thereby changing a start point of a window.

For example, during the process for an $n^{th}$ row line a range of from an $n+1^{th}$ row address to an $n+20^{th}$ row address to be outputted are set. If there are no coinciding values among $n+1^{th}$ to $n+20^{th}$ row addresses stored in the OTP memory 20, when the n+1 row address is inputted to the image signal processing unit 10, row address scanning for the $n+1^{th}$ to $n+20^{th}$ row addresses from the OTP memory 20 is skipped, and dead pixel row addresses corresponding to $n+21^{th}$ and n+40 are searched from the OTP memory 20.

Consequently, even when all the dead pixel position information stored in the OTP memory 20 is not read, it may be possible to acquire dead pixel position information on a row line to be processed next time and to perform dead pixel correction. Furthermore, a single dead pixel (SDP) is determined through an algorithm for determining a current SDP, and dead pixel correction is more accurately performed using the position information of an adjacent dead pixel (ADP), which is stored in the OTP memory 20.

Figure 3B:
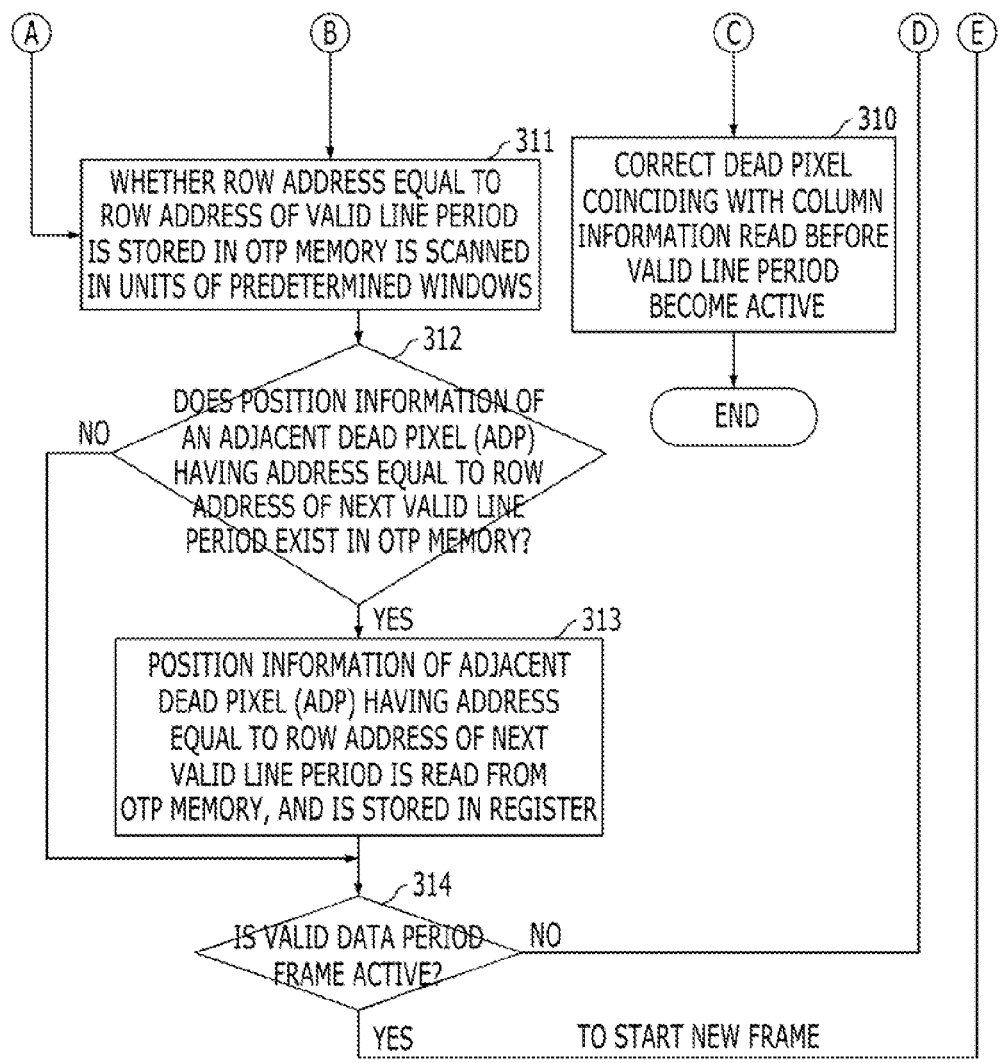

FIGS. 3A and 3B are detailed flow charts illustrating a process of correcting a dead pixel with respect to one frame period in a dead pixel correction method in accordance with the embodiment of the present invention.

First, as described above, the image data is read to extract the position information of the dead pixel, and the extracted information is stored in the OTP memory 20.

Next, before the first frame is processed, an initialization process of the image sensor is performed at step 301.

Then, the OTP data scanning section 11 scans row addresses of the OTP memory 20 at step 302.

Then, it is checked whether the scanned row addresses of the OTP memory 20 are equal to a start address of a timing generator (TG) at step 303.

As a result of the check, when the scanned row addresses of the OTP memory 20 are not equal to the start address of the timing generator (TG), a row address having a value larger than that of the start address of the timing generator among the row addresses of the OTP memory 20 is stored as a start address of the OTP memory at step 304.

Then, it is checked whether a valid data period (HSYNC, that is, a valid line period) for a line is active at step 305, and when the valid line period is active, a process of scanning the OTP memory 20 in units of predetermined (m) windows is performed at step 311.

Meanwhile, as the result of the check, when the scanned row addresses of the OTP memory 20 are equal to the start address of the timing generator (TG), a row address of the OTP memory 20 having a value equal to that of the start address of the timing generator is stored as the start address of the OTP memory at step 306.

Then, based on the stored start address of the OTP memory, dead pixel position information, for example, first row and column information, is read from the OTP memory 20 and is stored in the register at step 307.

Then, it is checked whether the valid data period (or the valid line period) for the line is active at step 308, and when the valid line period is active, the valid data determination section 12 checks whether there exists the stored position information (i.e., the first row and column information) read from the OTP memory 20 at step 309.

As a result of the check, when there exists the stored position information read from the OTP memory 20, the dead pixel correction section 14 corrects a dead pixel coinciding with the column information read before the valid line period becomes active at step 310.

As the result of the check, when there exist no stored position information read from the OTP memory 20, whether a row address equal to a row address of the valid line period is stored in the OTP memory 20 is scanned in units of predetermined (e.g., m) windows at step 311.

Then, the valid data determination section 12 checks whether the position information of an adjacent dead pixel (ADP) having an address equal to a row address of a next valid line period exists in the OTP memory 20 at step 312.

As a result of the check, when the position information of the adjacent dead pixel (ADP) having the address equal to the row address of the next valid line period does not exist in the OTP memory 20, the procedure proceeds to a step 314. When the position information of the adjacent dead pixel (ADP) having the address equal to the row address of the next valid line period exists in the OTP memory 20, the valid data pre-processing section 13 reads the position information (e.g., row and column information) of the adjacent dead pixel (ADP) having the address, which is equal to the row address of the next valid line period, from the OTP memory 20, and stores the read position information in the register at step 313.

Then, it is checked whether a valid data period (VSYNC that is, a valid frame period) for a frame is active at step 314. When the valid frame period is not active, the procedure proceeds to a step 308. When the valid frame period is active, the procedure proceeds to a step 307 to start a new frame.

Figure 4:
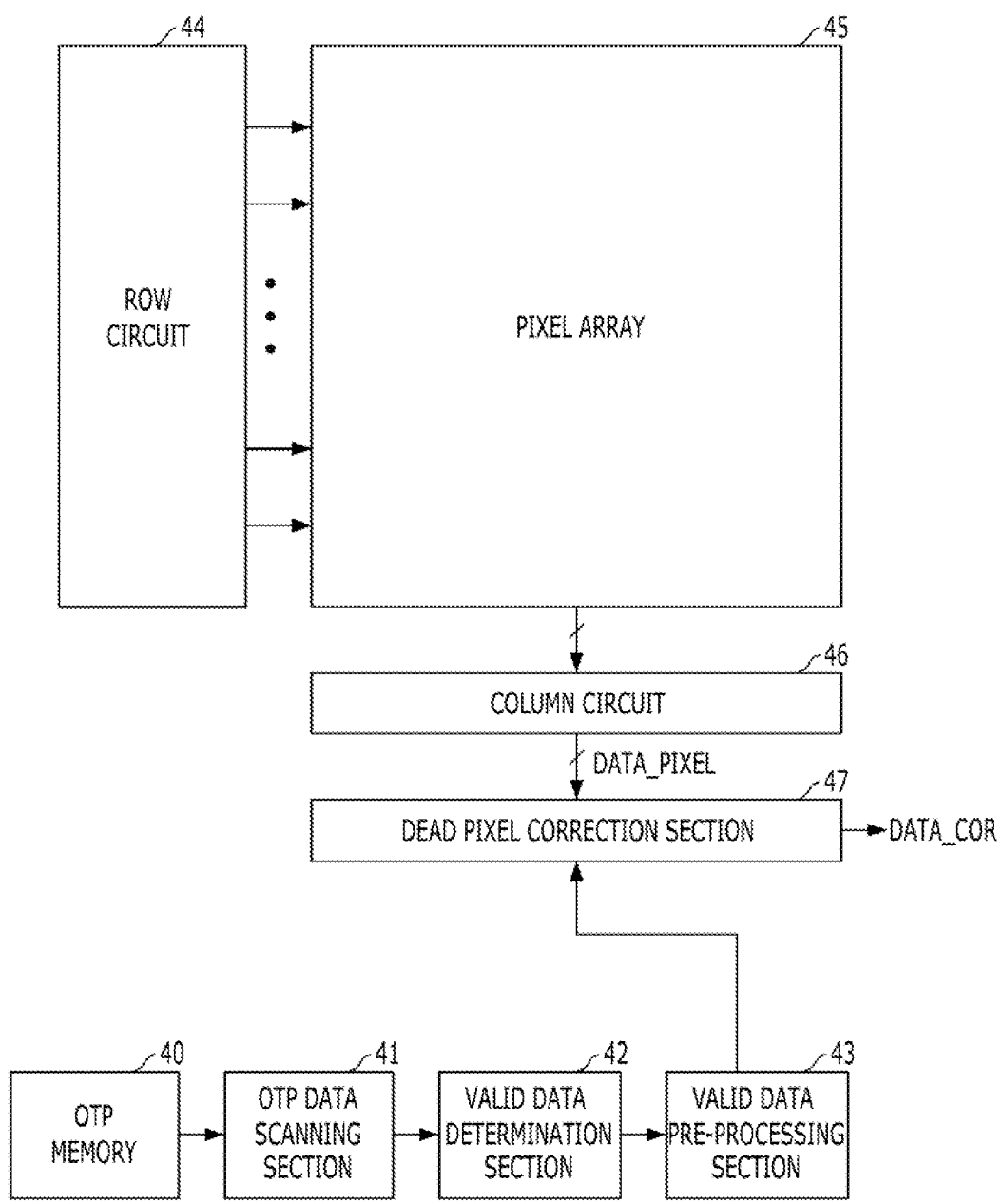
FIG. 4 is a block diagram illustrating an image sensor having a dead pixel correction apparatus in accordance with an embodiment of the present invention.

FIG. 4 is a block diagram illustrating an image sensor having a dead pixel correction apparatus in accordance with an embodiment of the present invention.

Referring to FIG. 4, the image sensor may include an OTP memory 40, an OTP data scanning section 41, a valid data determination section 42, a valid data pre-processing section 43, a row circuit 44, a pixel array 45, a column circuit 46, and a dead pixel correction section 47.

The OTP memory 40 may store the position information of a dead pixel previously obtained through reading and extracting processes for image data (or image information or pixel data).

The OTP data scanning section 41 may search (or scan) position information of dead pixels stored in the OTP memory 40.

The valid data determination section 42 may determine valid data with respect to the position information scanned by the OTP data scanning section 41.

The valid data pre-processing section 43 may pre-process the valid data determined by the valid data determination section 42.

Meanwhile, the row circuit 44 may include a row decoder (not illustrated) for selecting a row line and a row driver (not illustrated) for driving the selected row line within the pixel array 45.

The pixel array 45 may detect light using an optical element and generate a pixel signal corresponding to the detected light. Here, the pixels selected by the row decoder among the pixels provided in the pixel array 45, outputs the pixel signal. The outputted pixel signal is an analog pixel signal, which is an electrical signal, and includes a reset voltage and a signal voltage.

The column circuit 46 may include an analog-to-digital converter. The analog-to-digital converter may receive the analog pixel signal generated in the pixel array 45, convert the received analog pixel signal into a digital pixel signal, and output image data (or pixel data or image information) DATA_PIXEL.

The dead pixel correction section 47 is may correct pixel values corresponding to dead pixels in current image data DATA_PIXEL, which is outputted from the column circuit 46 based on the valid data pre-processed by the valid data pre-processing section 43, and output the corrected pixel data DATA_COR.

While the present invention has been described with respect to the specific embodiments, it will be apparent to those skilled in the art that various changes and modifications may be made without departing from the spirit and scope of the invention as defined in the following claims.

What is claimed is:

1. A dead pixel correction apparatus comprising:
   a storage unit including a one-time programmable (OTP) memory suitable for storing position information of dead pixels obtained from pixel data;
   a data scanning section suitable for scanning the position information stored in the storage unit;
   a valid data determination section suitable for determining valid data by using the scanned position information;
   a valid data pre-processing section suitable for pre-processing the determined valid data; and
   a dead pixel correction section suitable for correcting pixel values corresponding to the dead pixels in current pixel data based on the pre-processed valid data, and outputting the corrected pixel data,
   wherein the data scanning section searches whether the position information on row lines to be first and lastly inputted is included in the position information of the storage unit, and searches the position information on a next row line from the storage unit in units of predetermined windows during a process for a current row line after a first row line to determine in advance whether the position information corresponding to the next row line exists.

2. The dead pixel correction apparatus of claim 1, wherein the data scanning section reads the position information from the storage unit and stores the position information in a register.

3. The dead pixel correction apparatus of claim 1, wherein the storage unit is the one-time programmable (OTP) memory that stores position information obtained by reading and extracting pixel data acquired in a wafer level test, and the position information stored in the OTP memory includes position information of an adjacent dead pixel (ADP).

4. The dead pixel correction apparatus of claim 1, wherein the position information of dead pixels obtained from pixel data is not stored in a random access memory.

5. A dead pixel correction method comprising:
   (a) reading pixel data to extract position information of dead pixels from pixel data, and storing the position information in a storage unit including a one-time programmable (OTP) memory;
   (b) searching the position information on an initial row line from the storage unit, and storing the position information in a register;
   (c) correcting dead pixels with respect to a corresponding row line by using the position information stored in the register when pixel data is inputted; and
   (d) searching the position information on each of row lines from the storage unit in units of predetermined windows, storing the position information in the register, and correcting dead pixels with respect to the corresponding row line by using the position information stored in the register, wherein the position information on a next row line is searched from the OTP memory during a process for a current row line after a first row line to determine in advance whether position information corresponding to the next row line exists,
   wherein the step (b) comprises:
   (b1) searching whether the position information on row lines to be first and lastly inputted is included in the position information of the storage unit;
   (b2) searching the position information on a next row line from the storage unit, storing the information in the register, searching last position information of the storage unit, and storing the last position information in the register as the position information on a last row line, when the position information on the row lines to be first and lastly inputted is not searched as a result of the search of the step (b1); and
   (b3) searching the position information on the row lines to be first and lastly inputted from the storage unit, and storing the position information in the register, when the position information on the row lines to be first and lastly inputted is searched as the result of the search of the step (b1).

6. The dead pixel correction method of claim 5, wherein in the step (d), an index increase search method is used to search a row address stored in the OTP memory in units of predetermined windows, determine a row address for pixel data to be outputted next time, and change a start point of a window.

7. The dead pixel correction method of claim 5, wherein in the step (a), pixel data acquired in a wafer level test is read to extract dead pixel position information, the extracted position information is stored in the OTP memory, and the stored position information includes position information of an adjacent dead pixel (ADP).

8. The dead pixel correction method of claim 5, wherein the position information of dead pixels obtained from pixel data is not stored in a random access memory.

9. An image sensor comprising:
- a pixel array suitable for generating an analog pixel signal;
- a column circuit suitable for converting the analog pixel signal generated in the pixel array into a digital pixel signal, and outputting the digital pixel signal as a pixel data;
- a storage unit including a one-time programmable (OTP) memory suitable for storing position information of dead pixels obtained from pixel data;
- a data scanning section suitable for scanning the position information stored in the storage unit;
- a valid data determination section suitable for determining valid data with respect to the scanned position information;
- a valid data pre-processing section suitable for pre-processing the determined valid data; and
- a dead pixel correction section suitable for correcting pixel values corresponding to the dead pixels in current pixel data output from the column circuit based on the pre-processed position information, wherein the data scanning section searches whether the position information on row lines to be first and lastly inputted is included in the position information of the OTP memory, and searches the position information on a next row line from the OTP memory in units of predetermined windows during a process for a current row line after a first row line, to determine in advance whether the position information corresponding to the next row line exists.

10. The image sensor of claim 9, wherein the data scanning section reads the position information from the storage unit and stores the position information in a register.

11. The image sensor of claim 9, wherein the storage unit stores position information obtained by reading and extracting pixel data acquired in a wafer level test, and the position information stored in the OTP memory includes position information of an adjacent dead pixel (ADP).

12. The image sensor of claim 9, wherein the position information of dead pixels obtained from pixel data is not stored in a random access memory.

* * * * *